United States Patent [19]

Iriyama et al.

[11] Patent Number: 4,908,714

[45] Date of Patent: Mar. 13, 1990

[54] IMAGE TRANSMISSION APPARATUS

[75] Inventors: Norio Iriyama, Tokyo; Kunio Shijo; Yutaka Aoki, all of Tokyo, Japan

[73] Assignee: Konica Corporation, Tokyo, Japan

[21] Appl. No.: 236,980

[22] Filed: Aug. 26, 1988

[30] Foreign Application Priority Data

Aug. 29, 1987 [JP]  Japan .................................. 62-216032

[51] Int. Cl.$^4$ .............................................. H04N 1/00
[52] U.S. Cl. ..................................... 358/405; 358/439; 358/496
[58] Field of Search ............... 358/408, 439, 434, 468, 358/496

[56] References Cited

U.S. PATENT DOCUMENTS

| | | | |
|---|---|---|---|
| 4,064,389 | 12/1977 | Patterson ............................. | 358/405 |
| 4,432,020 | 2/1984 | Onose et al. ......................... | 358/257 |
| 4,573,083 | 2/1986 | Shimizu ........................... | 340/825.52 |
| 4,622,592 | 11/1986 | Ikehata et al. ....................... | 379/100 |
| 4,727,429 | 2/1988 | Ueno .................................... | 358/405 |

FOREIGN PATENT DOCUMENTS

| | | |
|---|---|---|
| 93484 | 9/1975 | Fed. Rep. of Germany . |
| 2951759 | 7/1980 | Fed. Rep. of Germany . |
| 58-54774 | 3/1983 | Japan .................................. 358/405 |
| 58-111486 | 7/1983 | Japan .................................. 358/405 |
| PCT/DE84/-00180 | 8/1984 | PCT Int'l Appl. . |

OTHER PUBLICATIONS

European Search Report No. EP 88307965 Dated Feb. 24, 1989.

*Primary Examiner*—Edward L. Coles, Sr.
*Attorney, Agent, or Firm*—Finnegan, Henderson, Farabow, Garrett and Dunner

[57] ABSTRACT

An image transmission apparatus includes an original reading unit, a memory, a communicating unit, an impressing unit, and a controller. The memory stores an image signal read by the original reading unit. The impressing means impresses a predetermined stamp on an original. The controller controls the impressing unit so that different stamps are impressed when the read image signal is directly transmitted by the communicating unit and when the read image signal is stored in the memory means.

4 Claims, 4 Drawing Sheets

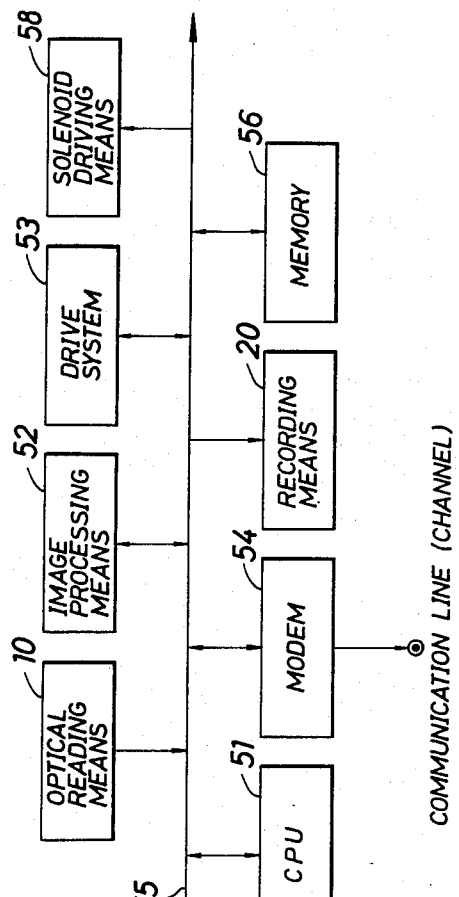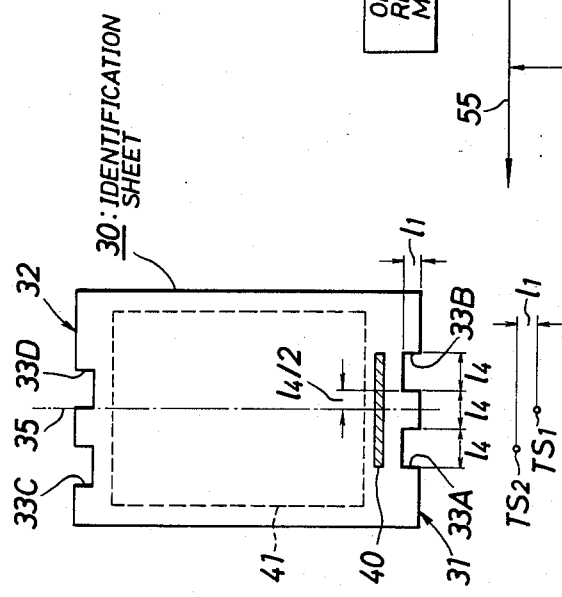

IMAGE TRANSMISSION APPARATUS

BACKGROUND OF THE INVENTION

The present invention relates to an image transmission apparatus which can be suitably applied to a facsimile apparatus having a transmission destination identification function capable of automatically detecting a transmission destination and transmitting an original.

An image transmission apparatus such as a facsimile apparatus having a transmission destination identification function capable of automatically detecting a transmission destination, changing connection of a telephone line, and transmitting an original to each destination has been developed.

In order to identify a transmission destination to change the transmission destination line, such a facsimile apparatus uses an identification sheet on which information of, e.g., a transmission destination is recorded.

Before an original is transmitted information of the identification sheet is read out to execute processing corresponding to the information, and then the original is transmitted.

The identification sheet is a sheet of paper of about an A4 size as an identification sheet in which a sheet identifying means such as an identification mark is formed and various pieces of information as described above are recorded. The recorded pieces of information are normally, optically read out.

Such an identification sheet can be used as follows. That is, when another person uses a facsimile apparatus to transmit an original, an operator records a transmission destination of his or her original on an identification sheet, places the identification sheet on the original during transmission of another person, and then places his or her original thereon. In this manner, the original of the operator can be automatically transmitted after the original of the person in the previous transmission is transmitted. In this case, an operation can be conveniently performed before previous communication is completed.

In order to realize such a method of using the identification sheet in a facsimile apparatus, even if communication to a current transmission destination is not successful, all transmission originals to the current communication destination must be discharged from an original table to detect an identification sheet and an original to the next destination which may be present thereon.

In this case, it should be noted that also originals which are not successfully transmitted must be discharged from an original table as those successfully transmitted. For example, these nontransmitted originals must be saved in a memory so that they can be easily retransmitted later. In addition, it is preferable to provide a means for easily determining originals to be retransmitted. For this reason, in a facsimile apparatus which uses an identification sheet and therefore can automatically transmit an original without an operator, it is very convenient to provide a means for checking transmitted originals.

This is because whether originals to be transmitted are normally transmitted or not transmitted due to, e.g., trouble on a communication line or misfeeding of the originals can be checked very effectively by such a checking means.

As a means for checking transmitted originals, a completion stamp is impressed.

This completion stamp is impressed at an end of an original when the original is normally transmitted and a signal (MCF signal) is responded from a transmission destination.

In some facsimile apparatuses having a transmission destination identification function, a memory means having a predetermined capacity is incorporated therein so that an image signal read from an original is stored in the memory means.

This memory means enables simultaneous communication and delay communication of an original.

Simultaneous communication is a communication system in which an image signal of an original is transmitted to a destination using a communication line while the original is read. Delay communication is a communication system in which image information of an original is written in a memory means and then read out therefrom at a proper timing to be transmitted using a communication line.

In this delay communication, an image signal is written in a memory if a communication line is busy, and an operator can transmit the stored image signal later.

In conventional apparatuses, however, image information of an original is not transmitted when it is stored in a memory in such delay communication, and therefore a completion stamp is not impressed thereon. Therefore, if an operator is away from an operating facsimile apparatus after setting an automatic transmission mode and then returns to the facsimile apparatus, he or she cannot know whether an original not having a completion stamp thereon is the one not transmitted due to trouble on a communication line or misfeeding of the original or the one not transmitted because the line is busy although it is stored in a memory. Therefore, the operator cannot determine which original is to be transmitted in delay communication.

A completion stamp may be impressed when image information is stored in a memory as it is transmitted. Also in this case, however, an operator cannot determine whether an original is already transmitted or only stored in the memory.

SUMMARY OF THE INVENTION

It is, therefore, an object of the present invention to provide an image transmission apparatus in which storage of image information of an original in a memory can be perfectly checked.

In order to achieve the above object of the present invention, there is provided an image transmission apparatus comprising: an original reading means; a memory means for storing an image signal read by the original reading means; a communicating means; an impressing means for impressing a predetermined stamp on an original; and a control means for controlling the impressing means such that different stamps are impressed when the read image signal is directly transmitted by the communicating means and when the read image signal is stored in the memory means.

BRIEF DESCRIPTION OF THE INVENTION

FIG. 4 is a plan view showing an identification sheet;

FIG. 5 is a block diagram showing a control system of the facsimile apparatus;

DETAILED DESCRIPTION OF THE PREFERRED EMBODIMENT

An image transmission apparatus according to the present invention applied to a facsimile apparatus having a transmission destination identification function will be described in detail below with reference to FIG. 1.

Figure 1:
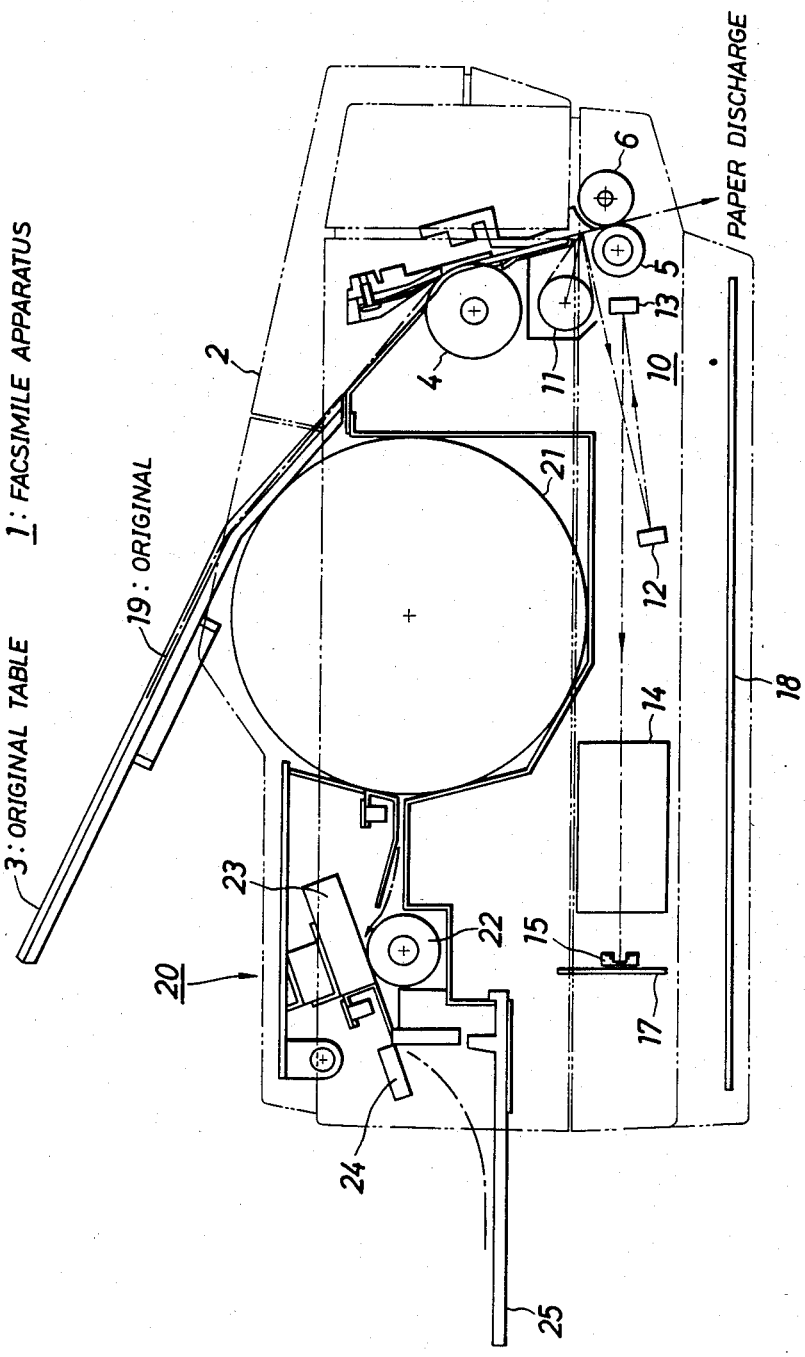
FIG. 1 is a side view showing an embodiment of an image transmission apparatus according to the present invention applied to a facsimile apparatus.

FIG. 1 is a schematic side view showing an overall arrangement of a facsimile apparatus to which the present invention is applied.

As is well known, a facsimile apparatus 1 comprises a rectangular parallelepiped member (main body) 2 which houses therein an optical reading means 10 for reading an original and a recording means 20 for recording received image data on recording paper.

An image signal read by the optical reading means 10 is transmitted to a destination through a communication line.

An original table 3 (inclined from upper left to lower right direction in FIG. 1) projects from an upper portion of the rectangular parallelepiped member 2. Originals, identification sheets, and the like (to be generally referred to as "originals" hereinafter unless otherwise specified) placed on the original table 3 are fed to the optical reading means 10.

An original inserted in the rectangular parallelepiped member 2 through an original insertion slit is fed downward by a paper feed roller (platen) 4 serving as part of a transporting means. Then, the type of original is determined or an original image is read before the original reaches paper discharge rollers 5 and 6.

For this purpose, a fluorescent lamp 11 is located between the paper feed roller 4 and the pair of paper discharge rollers 5 and 6 and illuminates the original surface. Reflected light (optical image information) obtained by this illumination is guided to an image reading element 15 through a pair of mirrors 12 and 13 and a lens system 14.

The image reading element 15 converts the optical image information into an electrical signal, i.e., an image signal. The image signal is stored through an image processing system (not shown) or supplied to a communication line.

A line sensor comprising an electric charge transmission element such as a CCD can be used as the image reading element 15. Reference numeral 17 denotes a mounting board for the CCD 15.

The original is transported downward at a predetermined speed. In this embodiment, image information is read in units of lines and sequentially converted into an image signal.

In this embodiment, the original fed at the predetermined speed is sandwiched between the pair of paper discharge rollers 5 and 6 and discharged from a bottom front portion of the rectangular parallelepiped member 2 to a tray (not shown) for receiving an original.

Although not shown, an upper front portion of the rectangular parallelepiped member 2 forms an operation panel, and various operation keys and display portions are formed thereon.

The recording means 20 will be described below.

The recording means 20 reproduces information of an incoming image signal on recording paper as a visual image.

The recording means 20 is located at an upper rear portion of the rectangular parallelepiped member 2.

For this reason, roll paper (recording paper) 21 is rotatably located at a central portion of the rectangular parallelepiped member 2 and fed to the platen roller 22.

A recording element 23 is slidably located on an upper outer surface of the platen roller 22. A linear thermal head can be used as the recording element 23.

Therefore, incoming image information is recorded on the recording paper 21 when the recording paper 21 transported to the upper surface of the platen roller 22 passes by the thermal head 23.

When the recording paper 21 on which the image information is recorded is transported by a predetermined length, an automatic cutter device 24 is driven to automatically cut a rear end portion of the recording paper 21. Therefore, although not shown, the automatic cutter device 24 comprises paper cut blades (fixed and movable ones) and a driving means for pivoting the movable blade.

Automatically-cut recording paper 21 is discharged onto the paper discharge tray 25 mounted on a rear portion of the rectangular parallelepiped member 2.

Figure 2:
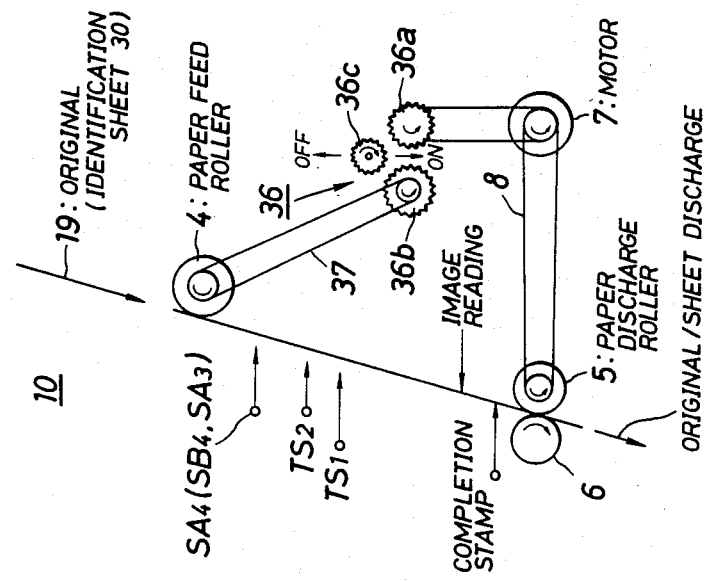
FIG. 2 is a schematic side view showing an original feeding system.

In the facsimile apparatus 1 having the above arrangement, the optical reading means 10, especially the paper transporting means and its peripheral portion are arranged as shown in FIG. 2.

In FIG. 2, reference numeral 7 denotes a drive motor. A rotational force of the drive motor 7 is transferred to the paper discharge roller 6 through a belt 8 and to the paper feed roller 4 through a clutch mechanism 36 and a belt 37.

The clutch mechanism 36 comprises a pair of fixed gears 36a and 36b and a movable gear 36c and is operated such that the paper feed roller 4 is driven only while an original 19 reaches the paper discharge roller 5.

A plurality of sensors are located along a path from a position at which the original 19 is fed by the paper feed roller 4 to a position at which the original 19 reaches the paper discharge roller 5.

A plurality of paper width sensors SA4, SA3, and SB4 for detecting original sizes are located at positions closest to the paper feed roller 4.

The paper width sensor SA3 detects an original size of A3; the sensor SA4, an original size of A4; and the sensor SB4, an original size of B4.

Figure 3:
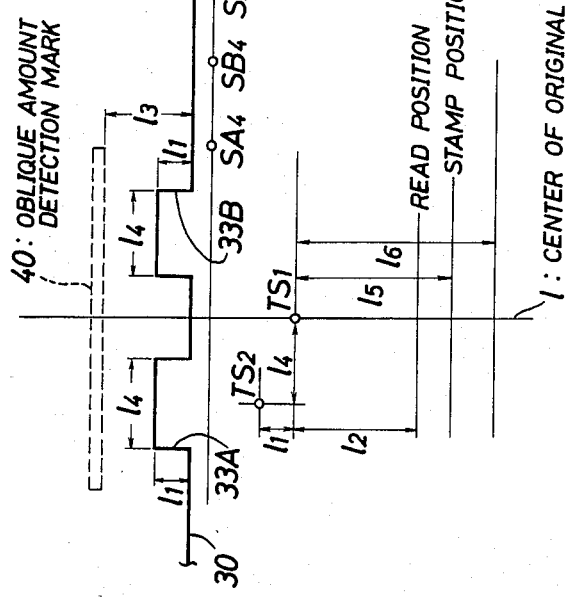
FIG. 3 is a view showing positional relationship between a plurality of sensors.

Since the paper width sensors SA4, SA3, and SB4 are provided for detecting original sizes, they are arranged straight by predetermined intervals in parallel with an image reading direction as shown in FIG. 3.

An actuator sensor is used as each of the paper width sensors SA4, SA3, and SB4, but an optical sensor or the like may be used.

A sensor (sheet determining sensor) TS2 for determining an identification sheet is located below and separated by a predetermined distance from the paper width sensors SA4, SA3, and SB4. Similarly, an image leading end reading sensor TS1 is located away from the sheet determining sensor TS2 by a distance l1. Actuator sensors can be used also as these sensors TS1 and TS2.

As shown in FIG. 3, an image reading position is located closer to the paper discharge roller 5, and the fluorescent lamp 11 illuminates this position.

Impression position of a completion stamp is located below the image reading position.

A completion stamp is impressed for confirmation when an image of the original 19 is accurately transmitted to a destination. The completion stamp is impressed at a lower surface trailing end portion of the original 19.

Note that FIG. 3 shows a positional relationship between the above plurality of sensors, and the image reading position and the like.

In order to transmit an original by the facsimile apparatus 1, an operator normally, manually dial the telephone. An identification sheet is used to automatically perform this operation.

In this identification sheet, pieces of information about a communication destination and the like are recorded and an identifying means for the sheet itself is formed. The identifying means is formed to determine whether paper fed in the apparatus is an original or an identification sheet. If the fed paper is an identification sheet, a communication line must be immediately disconnected or connected to a line of another transmission destination.

FIG. 4 shows an identification sheet 30.

In FIG. 4, A4-size paper is used along its longitudinal direction, and the longitudinal direction of the paper corresponds to an insertion direction (manual feeding direction) in the facsimile apparatus 1.

A bar-like oblique detection mark 40 having a predetermined width is formed at a leading end portion 31 of the identification sheet 30, and a recording area 41 in which various pieces of information such as a transmission destination are recorded is formed at its central portion.

Notches 33 are formed at the leading and trailing end portions 31 and 32 of the identification sheet 30 to serve as a sheet identifying means.

At least one notch 33 need be formed at each of the leading and trailing end portions 31 and 32. In this embodiment, however, two notches 33A and 33B and two notches 33C and 33D are formed at the leading and trailing end portions 31 and 32, respectively.

Since the sheet identifying means comprises the plurality of notches 33 as described above, detection accuracy can be improved. That is, not only when the identification sheet 30 is placed offset to the left or right, but also when it is reversed, it is reliably detected as an identification sheet.

The notches 33A and 33B having a width of l4 and a depth of l1 are formed at the leading end portion 31 at positions away from a central line 35 of the sheet by l4/2, respectively.

The width of the notches 33A and 33B equals to a mounting position interval l4 of the pair of sensors TS1 and TS2 along its main scanning direction (lateral direction in FIG. 4), but the width is not limited to this one. The depth of the notches 33A and 33B equals to a mounting position interval l1 of the pair of sensors TS1 and TS2 along its subscanning direction (longitudinal direction).

Positions of the notches 33C and 33D formed at the trailing end portion 32 are shifted to the left from the positions of notches 33A and 33B by l4/2. For this reason, if the identification sheet 30 is obliquely inserted, this can be reliably detected. That is, even if detection is failed at the leading end portion 31, detection can be reliably performed by the notches 33C and 33D at the trailing end portion 32.

As described above, the pair of notches 33A and 33B and the pair of notches 33C and 33D are formed at the leading and trailing end portions 31 and 32, respectively. Therefore, even when the identification sheet 30 is reversed or offset to the left or right on the original table 3, it can be reliably detected to be an identification sheet.

FIG. 5 shows control system 50 for system control, i.e., for totally controlling the entire facsimile apparatus 1.

In FIG. 5, reference numeral 51 denotes a CPU. The optical reading means 10 and the recording means 20 are controlled on the basis of a command supplied from the CPU 51 through a system bus 55. A drive system 53 is controlled on the basis of a command from the CPU 51.

The drive system 53 includes the motor 7 for feeding an original, the drive motors for the recording paper 21 and the automatic cutter device 24, and the rotational drive system for the platen roller 22.

An image signal from the communication line is supplied to the CPU 51 through a modem 54, and an image signal processed by an image processing means 52 is supplied to the communication line through the modem 54. The image signal is stored in a memory means 56 if necessary.

When transmission of an original is completed, a driving means 58 for a completion stamp solenoid is controlled on the basis of a command from the CPU 51, and the completion stamp is driven in accordance with the controlled state of the driving means.

In this case, the control of the solenoid driving means 58 is changed in accordance with whether simultaneous or delay communication is performed, i.e., whether the image signal is transmitted through the memory means 56 as described above.

Figure 7A:
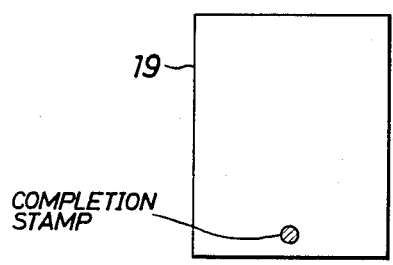
FIGS. 7A and 7B are views for explaining an operation of the completion stamp control program.
Figure 7B:
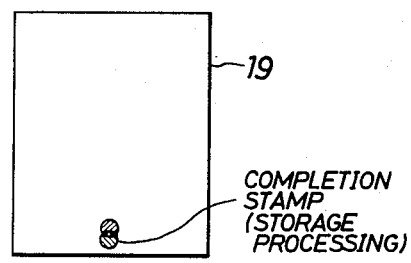

In this embodiment, as shown in FIGS. 7A and 7B, the completion stamp is impressed once in simultaneous communication (FIG. 7A) impressed twice in delay communication such that two stamps partially overlap each other (FIG. 7B).

Figure 6:
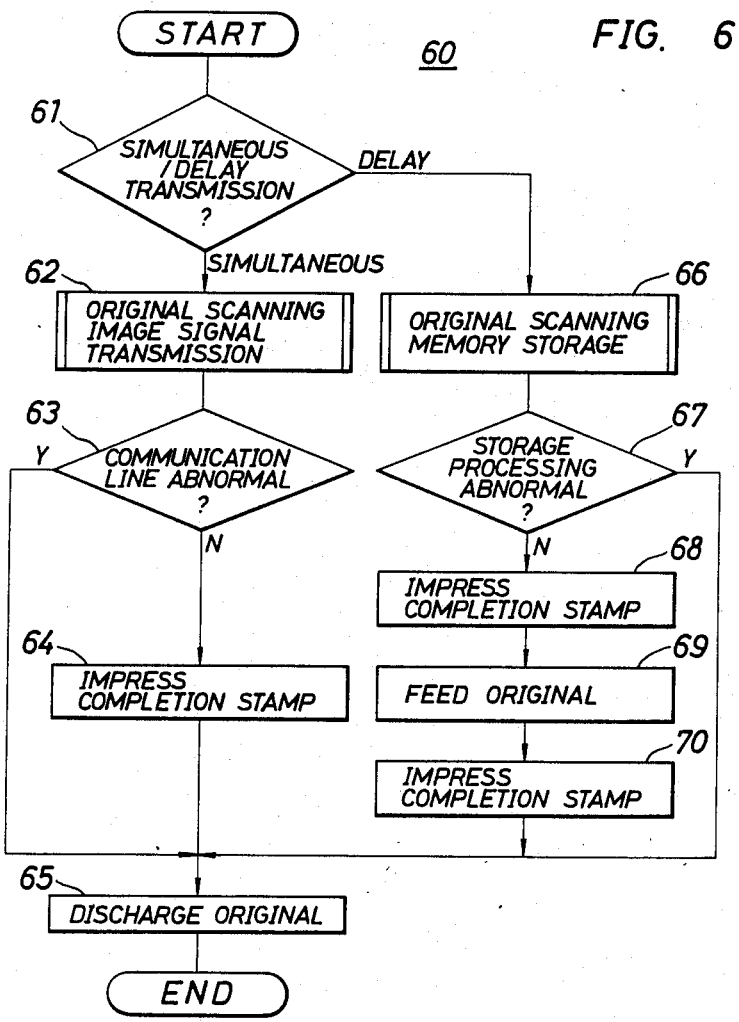
FIG. 6 is a flow chart for explaining a completion stamp control program.

FIG. 6 is a flow chart for explaining a control program of the facsimile apparatus 1, especially a control program for the completion stamp.

First, when an original is transported and read by the image reading means 10, the CPU 51 checks whether a simultaneous communication mode or a delay communication mode is to be performed in accordance with whether a destination communication line is opened or closed (step 61).

When the destination communication line is opened, this line is connected to scan the original, and an image signal is transmitted (step 62).

After the image signal is completely transmitted, the CPU 51 checks whether the communication line is abnormal (step 63). If the communication line is not abnormal and therefore the image signal is normally transmitted, an MCF signal is responded from the destination. When the MCF signal is received, a completion stamp mode is set (step 64).

That is, transport of the original is temporarily stopped, the solenoid driving means 58 is driven, and the completion stamp is impressed. Thereafter, the original is discharged (step 65).

Meanwhile, if the communication line is abnormal, an RTN signal representing the abnormality is responded from the destination. When the RTN signal is received, the original is discharged without the completion stamp is impressed thereon (steps 63 and 65).

In this manner, the completion stamp is impressed in accordance with whether the communication line is abnormal in simultaneous communication.

If delay communication is determined in step 61, the original is optically scanned and its image signal is sequentially stored in the memory means (step 66). Then, in step 67, an abnormality of storage processing is checked.

In this case, the abnormality of the storage processing is those of the transporting system and the memory means such that a capacity of the memory means 56 is already full and therefore a new image signal cannot be written or an original is jammed and hence is not normally transported during transport.

The abnormality in the storage processing is checked in step 67. If the storage processing is normal, transport of the original is temporarily stopped and the completion stamp is impressed (step 68) as described above, and then the original is slightly fed (step 69).

This feed amount of the original may be a feed amount obtained by driving of one or a plurality of steps of the motor 7 for driving the paper discharge rollers 5 and 6. After the original is slightly fed, the solenoid driving means 58 is driven, and the completion stamp is impressed (step 70).

Thereafter, the original is discharged as in the normal operation.

Therefore, when the communication line is not abnormal in simultaneous communication, one completion stamp is impressed at a predetermined position on the lower surface of the original as shown in FIG. 7A. In FIG. 7A, a black dot represents the completion stamp.

When the storage processing or the like is not abnormal in delay communication, two completion stamps are impressed so as to partially overlap each other as shown in FIG. 7B.

Therefore, an operator can visually, easily, and reliably check in accordance with the number of completion stamps whether the original is transmitted in simultaneous communication or merely stored in the memory (and therefore must be transmitted later).

Note that in the above embodiment, the number of completion stamps is changed to represent different states. However, a position, a print or a color of the completion stamp may be changed as long as simultaneous communication is distinguished from delay communication.

In the above embodiment, the completion stamp is impressed on the lower surface of an original. However, the completion stamp may be impressed on the upper surface. That is, when the completion stamp is to be impressed on the lower surface, it may be impressed on an original which is actually not read if a plurality of originals are stacked and transmitted at the same time. If the completion stamp is to be impressed on the upper surface, such an inconvenience is eliminated. In addition, a mode switch may be formed to select a mode of impressing or not impressing the completion stamp. If an operator stays at a facsimile apparatus, the mode of not impressing the completion stamp may be selected because the operator can check the operation. When the operator sets automatic transmission and is away from the apparatus, the mode of impressing the completion stamp may be selected. Alternatively, even if the operator stays at the apparatus, the mode of impressing the completion stamp may be selected to check whether originals are stacked and transmitted at the same time.

What is claimed is:

1. An image transmission apparatus comprising:
    original reading means;
    memory means for storing an image signal read by said original reading means;
    communicating means;
    impressing means for impressing a predetermined stamp on an original; and
    control means for controlling said impressing means so that different stamps are impressed when the read image signal is directly transmitted by said communicating means and when the read image signal is stored in said memory means.

2. An apparatus according to claim 1, wherein one stamp is impressed when the read image signal is directly transmitted by said communicating means and two stamps are impressed when the read image signal is stored in said memory means.

3. An apparatus according to claim 1, wherein stamp positions are different when the read image signal is directly transmitted by said communicating means and when the read image signal is stored in said memory means.

4. An apparatus according to claim 1, wherein stamps having different prints are impressed when the read image signal is directly transmitted by said communicating means and when the read image signal is stored in said memory means.

* * * * *